United States Patent
Yokota et al.

(10) Patent No.: US 10,611,230 B2
(45) Date of Patent: Apr. 7, 2020

(54) PROTECTION STRUCTURE FOR ON-VEHICLE HIGH-VOLTAGE COMPONENT

(71) Applicants: TOYOTA JIDOSHA KABUSHIKI KAISHA, Toyota-shi, Aichi-ken (JP); DENSO CORPORATION, Kariya, Aichi-pref. (JP)

(72) Inventors: Hideaki Yokota, Kariya (JP); Hirokazu Yamadaki, Kariya (JP); Yuji Kawazoe, Kariya (JP); Mizuaki Kitajima, Kurokawa-gun (JP); Takuya Abiko, Kurokawa-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 97 days.

(21) Appl. No.: 16/034,974

(22) Filed: Jul. 13, 2018

(65) Prior Publication Data
US 2019/0023116 A1 Jan. 24, 2019

(30) Foreign Application Priority Data
Jul. 18, 2017 (JP) ................................. 2017-138780

(51) Int. Cl.
*B60K 6/40* (2007.10)
*B60H 1/32* (2006.01)
(Continued)

(52) U.S. Cl.
CPC ............ *B60K 6/40* (2013.01); *B60H 1/2221* (2013.01); *B60H 1/3225* (2013.01); *B60K 1/00* (2013.01); *B62D 25/08* (2013.01); *B60H 2001/2278* (2013.01); *B60H 2001/2293* (2013.01); *B60Y 2306/01* (2013.01); *B60Y 2400/61* (2013.01)

(58) Field of Classification Search
USPC ......................................................... 180/274
See application file for complete search history.

(56) References Cited

U.S. PATENT DOCUMENTS 7,284,748 B2 * 10/2007 Mishima ................. F01N 13/14
267/136
8,054,633 B2 * 11/2011 Suwa ...................... B60L 1/003
361/728

(Continued)

FOREIGN PATENT DOCUMENTS

JP 2015-205595 A 11/2015

*Primary Examiner* — Ruth Ilan
*Assistant Examiner* — Hilary L Johns
(74) *Attorney, Agent, or Firm* — Oliff PLC

(57) ABSTRACT

A heater unit includes a heater case and a high-voltage component disposed on a mount surface of the heater case. A protector is disposed in front of the heater unit. The protector includes a protection cover and a protection member disposed laterally of the high-voltage component. The protection member includes a side surface (support wall) disposed along a forward-rearward direction; that is, an assumed collision direction. The leading edge of the side surface protrudes further than the high-voltage component. The length of the side surface in the forward-rearward direction is longer than the length from a position on the heater case with which the side surface comes into contact in a collision to a front surface of the high-voltage component.

7 Claims, 3 Drawing Sheets

(51) Int. Cl.
    *B60K 1/00*     (2006.01)
    *B62D 25/08*     (2006.01)
    *B60H 1/22*     (2006.01)

(56) References Cited

U.S. PATENT DOCUMENTS

| | | | |
|---|---|---|---|
| 8,637,796 B2 * | 1/2014 | Bohlender | H05B 3/50 |
| | | | 219/202 |
| 9,157,425 B2 * | 10/2015 | Watanabe | F04B 35/04 |
| 9,539,890 B2 * | 1/2017 | Miyazawa | B60K 6/26 |
| 2003/0200761 A1 * | 10/2003 | Funahashi | F01C 21/10 |
| | | | 62/228.4 |
| 2012/0223113 A1 * | 9/2012 | Gaisne | H01M 2/1083 |
| | | | 224/538 |
| 2013/0049550 A1 * | 2/2013 | Watanabe | F04B 39/121 |
| | | | 310/67 R |
| 2013/0199836 A1 * | 8/2013 | Adachi | H05K 9/002 |
| | | | 174/384 |
| 2013/0242484 A1 * | 9/2013 | Schweichart | H05K 5/03 |
| | | | 361/679.01 |
| 2015/0121767 A1 * | 5/2015 | Nagamori | B60K 1/00 |
| | | | 49/463 |
| 2016/0229308 A1 * | 8/2016 | Nusier | B60L 11/1879 |
| 2017/0100998 A1 * | 4/2017 | Suzuki | B60K 6/26 |
| 2018/0281595 A1 * | 10/2018 | Hiraiwa | B62D 25/2027 |
| 2018/0290689 A1 * | 10/2018 | Yoshii | B60K 1/00 |

\* cited by examiner

PROTECTION STRUCTURE FOR ON-VEHICLE HIGH-VOLTAGE COMPONENT

CROSS REFERENCE TO RELATED APPLICATION

The disclosure of Japanese Patent Application No. 2017-138780 filed on Jul. 18, 2017, including the specification, claims, drawings, and abstract, is incorporated herein by reference in its entirety.

TECHNICAL FIELD

The present disclosure relates to a protection structure for a high-voltage component installed on a vehicle.

BACKGROUND

Some types of recent vehicles include on-vehicle electrical equipment to which high voltage is applied. Patent Document 1 indicated below discloses, as electric equipment to which high voltage is applied, an inverter 53 that converts direct-current power supplied from an on-vehicle battery to alternating-current power and supplies the alternating-current power to a motor for travelling. Patent Document 1 further discloses a structure that protects the inverter 53 in a vehicle collision. In a collision, a reinforcement member 3 deforms to lift the inverter 53 upward, thereby preventing the inverter 53 from coming into contact with a transaxle 52 located behind the inverter 53. Reference numerals used above are those used in Patent Document 1 and are not relevant to those for elements described in the embodiment of the present disclosure.

CITATION LIST

Patent Literature

[Patent Document 1] JP 2015-205595 A

SUMMARY

Technical Problem

An implementation of the disclosure is directed toward protecting, in a vehicle collision, a high-voltage component to which high voltage is applied.

Solution to Problem

In accordance with an aspect of the disclosure, a protection structure for an on-vehicle high-voltage component includes a base member having a mount surface oriented in an assumed collision direction within a horizontal plane and being fixed to a vehicle body; a high-voltage component disposed on a front side of the mount surface in the collision direction; and at least one protection member disposed on the front side of the mount surface to support a collision object laterally of the high-voltage component and protect the high-voltage component. The protection member includes a support wall disposed along the collision direction and having a leading edge that protrudes further than the high-voltage component in the collision direction. The support wall has a length in the collision direction that is longer than a length from a position on the base member with which the support wall comes into contact during a collision to a position on the high-voltage component which is furthest from the mount surface.

In a collision of a vehicle, the protection structure supports an object which is to come into contact with the high-voltage component such that the support wall extends between the object and the base member, thereby protecting the high-voltage component against the object. Further, the protection member made of sheet metal reduces the weight.

Two protection members may be disposed at two locations with the high-voltage component being interposed therebetween. The protection members disposed at two locations come into contact with the collision object before the high-voltage component contacts the collision object, even when the collision object is inclined.

The base member is a casting and may include a plate-like portion defining the mount surface and a wall portion vertically disposed on the plate-like portion. At least a part of the support wall may be aligned with the position of the wall portion of the base member. The portion of the base member where the wall portion is provided has a high strength and therefore reliably supports the support wall.

The base member may be a heater case that houses a heating element for heating a heating liquid medium. The plate-like portion of the base member is a surface of the heater case that is oriented in the collision direction, and the wall portion is a side surface of the heater case. The protection structure protects the high-voltage component disposed on the surface of the heater case.

The at least one protection member may have a cross section of a mountain shape formed by bending sheet metal such that a first side surface of the mountain shape corresponds to the support wall. The at least one protection member may also be a ridge member extending along the mount surface. This structure of the protection member stabilizes the position and orientation of support wall.

The at least one protection member may be disposed such that a second side surface of the mountain shape is placed to bridge over the high-voltage component. The protection member, which is disposed close to the high-voltage component, reduces a force to be applied to the high-voltage component.

The protection structure may further include a cover plate disposed to cover the front side of the high-voltage component. The protection member may be coupled to the cover plate. The cover plate may protect the high-voltage component against the object approaching while avoiding the protection member.

Advantageous Effects of Invention

In a vehicle collision, the protection structure supports an object which is to come into contact with the high-voltage component such that the support wall extends between the object and the base member, thereby protecting the high-voltage component.

BRIEF DESCRIPTION OF DRAWINGS

Embodiment(s) of the present disclosure will be described by reference to the following figures, wherein.

DESCRIPTION OF EMBODIMENTS

Figure 1:
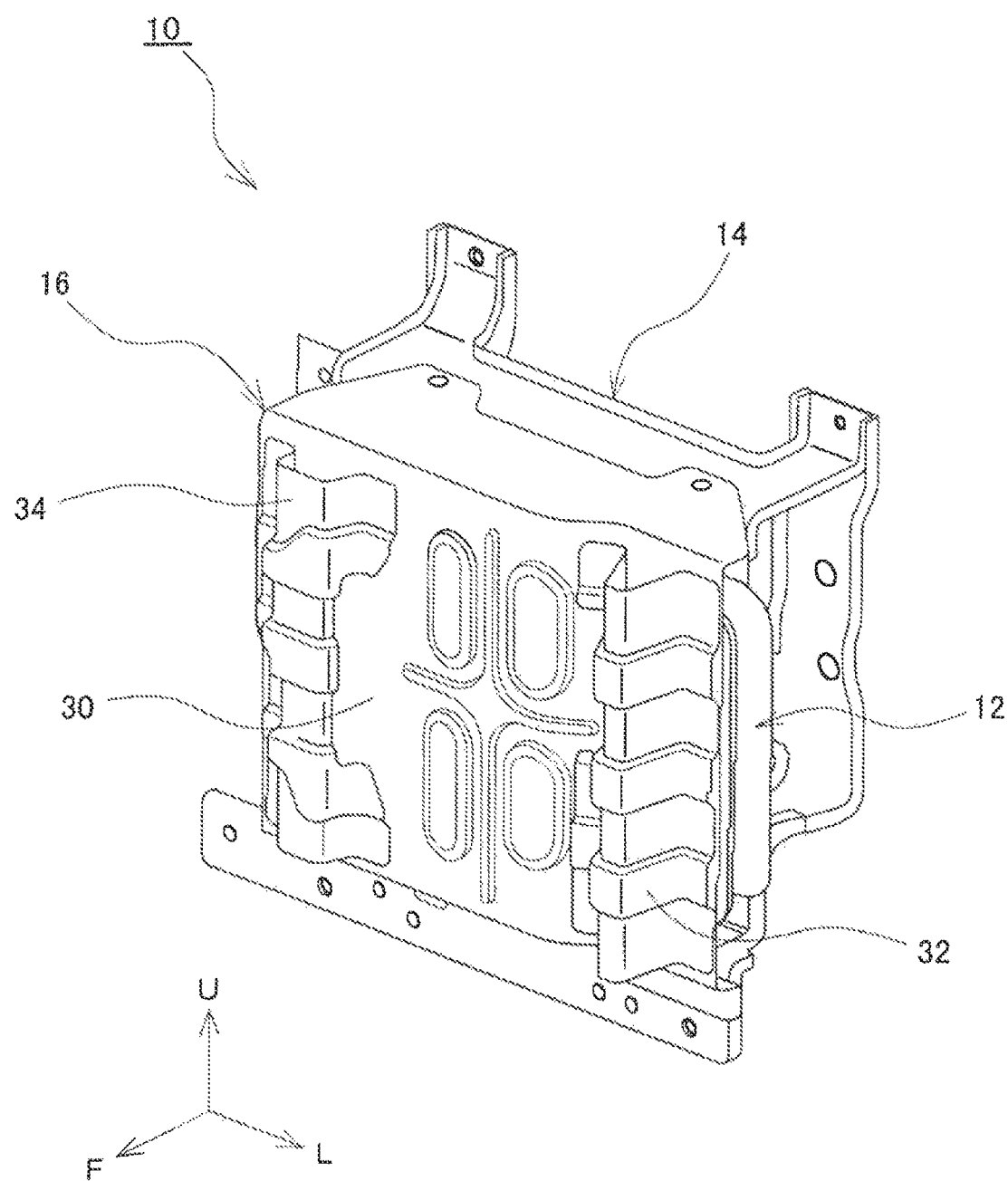
FIG. 1 is a perspective view of an outer appearance of an air conditioner heater 10 for a vehicle, including a high-voltage component.
Figure 2:
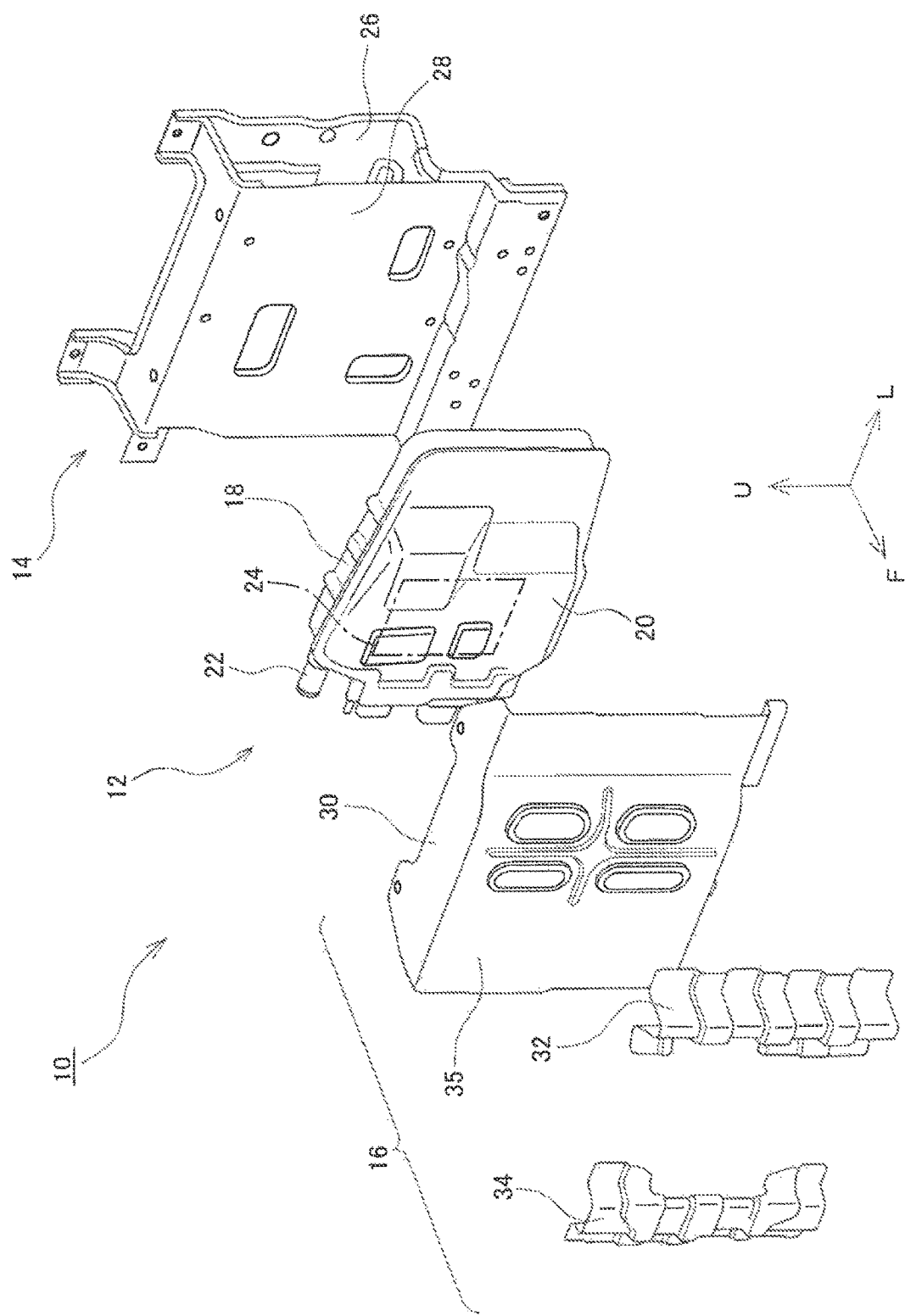
FIG. 2 is an exploded perspective view of the air conditioner heater 10.

An embodiment of the disclosure will be described with reference to the drawings. FIG. 1 and FIG. 2 illustrate the outer appearance of the air conditioner heater 10; FIG. 1 is a perspective view and FIG. 2 is an exploded perspective view of the air conditioner heater 10. Vehicles including an internal combustion engine as a drive motor can heat the interior of a car cabin with heat generated by the internal combustion engine. Hybrid vehicles or plug-in hybrid vehicles, which have been in wide use recently, may travel without causing the internal combustion engine to operate. In this case, it is not possible to use waste heat of the internal combustion engine for heating or to perform sufficient heating. Electric vehicles, without an internal combustion engine, do not have sufficient waste heat for use in heating. The air conditioner heater 10 according to the present embodiment generates Joule heat using electric power from a battery that supplies electric power to an electric motor for driving the vehicle, and uses the Joule heat to heat a liquid medium such as water. The liquid medium thus heated is conveyed to a radiator disposed within a car cabin to heat the air within the car cabin.

The air conditioner heater 10 is disposed within an engine compartment located at a front portion of the vehicle, and is fixed to a dashboard, that is, a panel member that separates the engine compartment from the car cabin. FIGS. 1 and 2 show directions when the air conditioner heater 10 is installed in a vehicle; an arrow F indicates a forward direction of a vehicle, an arrow L indicates a direction toward left, and an arrow U indicates an upward direction of the vehicle. In the following description, unless otherwise specified, the forward, rear, left and right, and upward and downward directions refer to directions with respect to a vehicle. The air conditioner heater 10 includes a heater unit 12 for heating a liquid medium, a bracket 14 for securing the heater unit 12 to the dashboard, and a protector 16 for protecting an electric circuit of the heater unit 12.

The heater unit 12 includes a heater case 18 that defines therein a heating chamber 17 (see FIG. 3) where a liquid medium is heated. The heater case 18 houses a heating element that heats the liquid medium. The heater unit 12 further includes an electric circuit (not shown) disposed outside the heater case 18 for supplying electric power to the heating element, and a circuit cover 20 that covers the electric circuit. The heater case 18 is made of a cast metal, such as an aluminum die-casting, and includes an introducing pipe (not shown) and a lead-out pipe 22 for introducing the liquid medium into or out of the heating chamber 17. The circuit cover 20 may be made of sheet metal such as aluminum or a resin. The circuit cover 20 covers a high-voltage component 24 including a circuit to which high voltage is applied. The high-voltage component 24 is disposed inside the circuit cover 20 at the position indicated by a dot-dash line in FIG. 2. More specifically, the high-voltage component 24 is disposed on a forward side of a surface of the heater case 18 facing the forward direction of the vehicle. The high-voltage component 24 receives supply of electric power at a higher voltage than that of electric power supplied to typical on-vehicle electric equipment, such as a lighting device, a fan of an air conditioner, a motor of a power window, and on-vehicle audio devices. Typically, the voltage of the electric power supplied to the typical on-vehicle electric equipment is 12 or 24 V, and the voltage of the electric power supplied to the high-voltage component 24 from the on-vehicle battery is higher, such as several tens of V or higher, or 100 V or higher, or 200 V or higher. The liquid medium introduced into the heating chamber 17 is heated by the heating element and introduced out of the lead-out pipe 22 into the radiator within the car cabin. The liquid medium then dissipates heat in the radiator for cooling and is again introduced, via the introducing pipe, into the heating chamber 17.

The bracket 14 includes a bracket base 26 and a bracket plate 28. The bracket base 26 and the bracket plate 28 may be made of sheet metal. The bracket base 26 is coupled to the dashboard by means of a fastener element such as a bolt or through welding. The bracket plate 28 is coupled to the heater unit 12 by means of a fastener member such as a bolt. The heater unit 12 is fixed to the vehicle body by coupling the bracket base 26 with the bracket plate 28.

The protector 16 includes a protection cover 30 covering the front side of the heater unit 12, and protection ridges 32 and 34 located further forward from the protection cover 30. The protection ridge 32 is located further leftward than the high-voltage component 24, and a part of the protection ridge 34 is located further rightward than the high-voltage component 24. The protection cover 30 is made of sheet metal such as steel and is fixed to the bracket plate 28 by means of a fastener element such as a bolt. Specifically, the protection cover 30, having a squared U shape in cross section, is disposed beyond the edges of the heater unit 12 in the upward-downward direction and is fixed to the top surface and the lower edge portion of the front surface of the bracket plate 28 in FIG. 2. The protection ridges 32 and 34 are disposed on a surface of the protection cover 30 corresponding to a center vertical plane of the squared U shape; that is, a surface 35 of the protection cover 30 facing forward (hereinafter referred to as a protection cover front surface 35). The protection ridges 32 and 34 are made of sheet metal, such as steel, and are shaped by bending the sheet metal to each have a ridge shape as a whole having a mountain-shape horizontal cross section. The protection ridges 32 and 34 are coupled to the protection cover 30 as ridges extending in the upward-downward direction, such as along substantially the entire length of the protection cover surface 35 in the upward-downward direction or the vertical direction. The protection ridges 32 and 34 may be welded to the protection cover 30. In collision, the protection cover 30 can protect the heater unit 12, particularly the high-voltage component 24, against an object approaching while avoiding the protection ridges 32 and 34, such as an object approaching from between the protection ridges 32 and 34.

Figure 3:
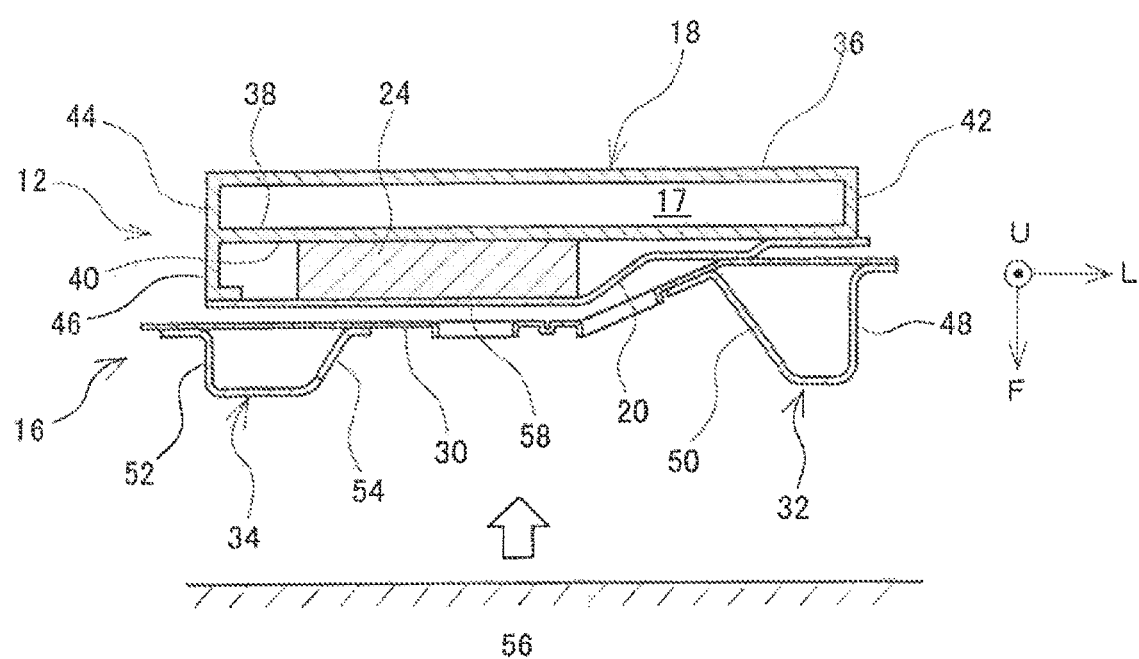
FIG. 3 is a horizontal cross sectional view of the air conditioner heater 10.

FIG. 3 schematically illustrates a horizontal cross section of the heater unit 12 and the protector 16. In FIG. 3, the downward direction indicates the forward direction of the vehicle and the right direction indicates the leftward direction of the vehicle. The heater case 18 includes a container portion 36 having a substantially rectangular cross section and defining the heating chamber 17. The high-voltage component 24 is disposed on a plate-like member 38 located on the front side of the container portion 36. The surface of the plate-like member 38 on the front side defines a mount surface 40. The heater case 18 is a base member having the mount surface 40 and is fixed to the vehicle body via the bracket 14. The container portion 36 includes wall members 42 and 44 vertically extending from the plate-like member 38 located on the forward side to define sides of the heating chamber 17. The heater case 18 further includes an extension wall 46 to extend the wall member 44 forward. The circuit cover 20 is fixed to the front edge of the extension wall 46.

Each of the protection ridges 32 and 34 has a cross section of a mountain shape protruding from the protection cover 30. In FIG. 3, the top of the mountain shape is directed downward. The protection ridge 32 having a mountain shape may have a flat top portion. The protection ridge 32 further includes side surfaces 48 and 50 that are gradually flared from the top toward the foot of the mountain shape. In this configuration, the protection ridge 32 has a cross section of a substantially trapezoidal shape. When the protection ridge 32 has a top portion without a flat portion, the cross section of the protection ridge 32 is a substantially triangle shape, and the top portion may be rounded. Alternatively, the protection ridge 32 may have side surfaces 48 and 50 which are parallel to each other, which would result in a cross section of a U shape. In this configuration, the top portion may include a flat portion. A U shape cross section with a flat top portion would result in a substantially squared U shape. The protection ridge 34, similar to the protection ridge 32, may have a cross section of a substantially triangle shape, a substantially trapezoid shape, a substantially U shape, or a substantially squared U shape. The protection ridge 34 illustrated in FIG. 3 has a substantially trapezoidal cross section, with side surfaces 52 and 54 flaring from the top toward the foot. The side surfaces 48, 50, 52, and 54 include flanges at ends. The flanges are welded to the protection cover 30 to thereby couple the protection ridges 32 and 34 with the protection cover 30. A mountain shape having a flat top portion and flanges would form a hat shape. The protection ridges 32 and 34 having a cross section of a mountain shape can be supported at two portions, so that the positions and orientations of the side surfaces 48, 50, 52, and 54 are stabilized. Further, as illustrated in FIGS. 1 and 2, the side surfaces 48, 50, 52, and 54 have uneven shapes in the extending direction of the protection ridges 32 and 34.

It is required that the high-voltage component should be protected in a vehicle collision. The installation position of the high-voltage component on the vehicle body and the orientation of the subject to which the high-voltage component is installed define an assumed primary collision direction. In the case of the air conditioner heater 10, as the high-voltage component is disposed on the front surface of the dashboard while facing forward, the assumed collision direction is a forward direction. In a forward collision, the high-voltage component 24 may be trapped between the mount surface 40 of the heater case 18 facing forward, on which the high-voltage component 24 is disposed, and an object 56 approaching from forward. When the high-voltage component is located on the rear portion of the vehicle and the surface on which the high-voltage component is disposed faces rearward, the assumed collision direction is a backward direction. When the surface on which the high-voltage component is disposed faces rightward or leftward in relation to the vehicle, the collision from right or left, respectively, is assumed.

In a collision, the protection ridges 32 and 34 support the object 56 while being collapsed for themselves, thereby reducing a force to be applied to the high-voltage component 24 or preventing the object 56 from coming into contact with the high-voltage component 24, for protecting the high-voltage component 24. The side surfaces 48 and 52 of the protection ridges 32 and 34, respectively, which are disposed substantially along the collision direction, have great strength against a load in the collision direction and therefore function as support walls supporting the object 56. The side surfaces (support walls) 48 and 52 support the object 56 at lateral positions shifted from the front of the high-voltage component 24. In a collision, the side surfaces 48 and 52 collapse to absorb the energy of collision, thereby preventing the object 56 from contacting the high-voltage component 24.

The front edge of the side surface (support wall) 48 of the protection ridge 32 protrudes further forward than the front surface 58 of the high-voltage component 24 which is furthest from the mount surface 40. In a collision, the side surface 48 comes into contact with the plate-like member 38 of the heater case 18. In this contact state, the front edge of the side surface 48 is located further forward than the front surface of the high-voltage component. For this purpose, the length of the side surface 48 in the forward-rearward direction; that is, in the direction along the collision direction, is longer than the length from the mount surface 40 to the front surface 58 of the high-voltage component 24.

At least a part of the side surface (support wall) 48 of the protection ridge 32 is aligned with the wall member 42 of the heater case 18 and comes into contact with the position of the wall member 42 in a collision. The plate-like member 38 provides a high strength at a position where wall member 42 is located on the front side of the heater case 18. The heater case 18 therefore achieves reliable support for the side surface 48 by allowing the side surface 48 to contact with such a high strength position.

Further, the side surface (support wall) 48 of the protection ridge 32, having an uneven shape in the extending direction of the ridge, has high strength in the collision direction. This enhances support for the object 56 by the side surface (support wall) 48.

The front end of the side surface (support wall) 52 of the protection ridge 34 protrudes further forward than the front surface 58 of the high-voltage component 24 which is furthest from the mount surface 40. In a collision, the side surface 52 comes into contact with the front edge of the extension wall 46 of the heater case 18. In this contact state, the front end of the side surface 52 is located further forward than the front surface 58 of the high-voltage component 24. For this purpose, the length of the side surface 52 and the extension wall 46, when combined, in the forward-rearward direction; that is, in the direction along the collision direction, is longer than the length of the high-voltage component 24 along the collision direction. Further, the length of the side surface 52 in the forward-rearward direction; that is, in the direction along the collision direction, is longer than the length from the front edge of the extension wall 46 to the front surface 58 of the high-voltage component.

At least a part of the side surface (support wall) 52 of the protection ridge 34 is aligned with the wall member 44 and the extension wall 46 of the heater case 18 and comes into contact with the positions of the wall member 44 and the extension wall 46 in a collision. The plate-like member 38 provides high strength at positions where the wall member 44 and the extension wall 46 are located on the front side of the heater case 18. The heater case 18 therefore achieves reliable support for the side surface 52 by allowing the side surface 52 to contact with such high strength positions.

Further, the side surface (support wall) 52 of the protection ridge 34, having an uneven shape in the extending direction of the ridge, has high strength in the collision direction. This enhances support for the object 56 by the side surface (support wall) 52.

The protection ridge 34 includes the side surface 54 only at both end portions in the extending direction of the protection ridge 34, and is coupled with the protection cover 30 at these end portions. The side surface 54 is disposed to bridge over and thus avoid the high-voltage component 24. This configuration reduces a force applied to the high-voltage component 24 in a collision.

The positions of the side surfaces (support walls) 48 and 52 of the protection ridges 32 and 34 may be aligned with positions of wall-like members vertically disposed on the plate-like member 38 on the front side of the heater case 18, such as ribs, or bulkheads provided in the heating chamber 17, in place of the positions of the wall members 42 and 44 of the heater case 18. Further, the cross section of the protection ridges 32 and 34 may be a closed mountain shape or a closed U shape rather than the mountain shape or the U shape described above. A mountain shape with a closed foot portion would have a substantially trapezoidal cross section, and a U shape with a closed foot would have a substantially rectangular cross section with a rounded top.

The two protection ridges 32 and 34 disposed with the high-voltage component 24 being interposed therebetween protect the high-voltage component 24 in the following manner: in a collision, either one of the protection ridges 32 and 34 may come into contact with the collision object 56 approaching even in an inclined state, before a force is applied to the high-voltage component 24.

REFERENCE SIGNS LIST 10 air conditioner heater, 12 heater unit, 14 bracket, 16 protector, 17 heating chamber, 18 heater case (base member), 20 circuit cover, 22 lead-out pipe, 24 high-voltage component, 26 bracket base, 28 bracket plate, 30 protection cover, 32, 34 protection ridge, 35 protection cover front surface, 36 container portion, 38 plate-like member (plat-like portion) on the front side, 40 mount surface, 42 wall member (wall portion), 44 wall member (wall portion), 46 extension wall, 48 side surface (support wall), 50 side surface, 52 side surface (support wall), 54 side surface, 56 object, 58 front surface of high-voltage component.

The invention claimed is:

1. A protection structure for an on-vehicle high-voltage component, comprising:
    a base member having a mount surface oriented in an assumed collision direction within a horizontal plane, the base member being fixed to a vehicle body;
    a high-voltage component disposed on a front side of the mount surface in the collision direction; and
    at least one protection member disposed on the front side of the mount surface to support a collision object laterally of the high-voltage component and protect the high-voltage component, wherein
    the at least one protection member includes a support wall disposed along the collision direction, the support wall having a leading edge that protrudes further than the high-voltage component in the collision direction, and the support wall has a length in the collision direction that is longer than a length from a position on the base member with which the support wall comes into contact in a collision to a position on the high-voltage component which is furthest from the mount surface.

2. The protection structure for an on-vehicle high-voltage component according to claim 1, wherein
    the at least one protection member comprises two protection members, and
    the two protection members are respectively disposed at two locations with the high-voltage component being interposed between the two locations.

3. The protection structure for an on-vehicle high-voltage component according to claim 1, wherein
    the base member is a casting and has a plate-like portion that defines the mount surface and a wall portion vertically disposed on the plate-like portion, and
    at least a part of the support wall is aligned with a position of the wall portion of the base member.

4. The protection structure for an on-vehicle high-voltage component according to claim 3, wherein
    the base member is a heater case that houses a heating element for heating a heating liquid medium, the plate-like portion of the base member is a surface of the heater case that is oriented in the collision direction, and the wall portion of the base member is a side surface of the heater case.

5. The protection structure for an on-vehicle high-voltage component according to claim 1, wherein
    the at least one protection member has a cross section of a mountain shape formed by bending a sheet metal such that a first side surface of the mountain shape corresponds to the support wall, and the at least one protection member is a ridge member extending along the mount surface.

6. The protection structure for an on-vehicle high-voltage component according to claim 5, wherein
    the at least one protection member is disposed such that a second side surface of the mountain shape is disposed to bridge over the high-voltage component.

7. The protection structure for an on-vehicle high-voltage component according to claim 1, further comprising a cover plate disposed to cover the front side of the high-voltage component, wherein
    the at least one protection member is coupled to the cover plate.

* * * * *